United States Patent
Chang et al.

(10) Patent No.: US 8,894,265 B2
(45) Date of Patent: Nov. 25, 2014

(54) BACKLIGHT MODULE WITH LIGHT GUIDE PLATE HAVING OPTICALLY SEPARATED LIGHT GUIDE BODY

(75) Inventors: Wei-Tien Chang, Hsin-Chu (TW); Kuang-Tao Sung, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 332 days.

(21) Appl. No.: 13/273,647

(22) Filed: Oct. 14, 2011

(65) Prior Publication Data

US 2012/0170314 A1 Jul. 5, 2012

(30) Foreign Application Priority Data

Dec. 30, 2010 (TW) .............................. 99147015 A

(51) Int. Cl.
*G02F 1/1335* (2006.01)
*F21V 7/04* (2006.01)
*F21V 8/00* (2006.01)

(52) U.S. Cl.
CPC ............ *G02B 6/0068* (2013.01); *G02B 6/0038* (2013.01); *G02B 6/0078* (2013.01)
USPC ............ 362/616; 362/628; 362/23.1; 349/65; 385/129

(58) Field of Classification Search
USPC ............. 362/23.1, 23.17, 616, 620, 628, 511; 349/65; 385/129
See application file for complete search history.

(56) References Cited

U.S. PATENT DOCUMENTS

| 4,954,930 | A  | * | 9/1990  | Maegawa et al. ............... 362/26 |
| 6,443,582 | B1 | * | 9/2002  | Tarne et al. ..................... 362/27 |
| 7,018,059 | B2 |   | 3/2006  | Yu et al. |
| 7,290,917 | B2 |   | 11/2007 | Cho et al. |
| 7,505,024 | B2 | * | 3/2009  | Yoo et al. ...................... 345/102 |
| 7,616,271 | B2 | * | 11/2009 | Souk et al. ...................... 349/65 |
| 7,764,334 | B2 | * | 7/2010  | Kitagawa et al. ............... 349/65 |
| 8,089,582 | B2 | * | 1/2012  | Sekiguchi et al. .............. 349/65 |
| 8,491,174 | B2 | * | 7/2013  | Derichs ........................ 362/612 |
| 8,506,152 | B2 | * | 8/2013  | Kim et al. ..................... 362/617 |
| 8,508,692 | B2 | * | 8/2013  | Han et al. ........................ 349/65 |

(Continued)

FOREIGN PATENT DOCUMENTS

| CN | 101165515 A | 4/2008 |
| CN | 101533120   | 9/2009 |

(Continued)

OTHER PUBLICATIONS

English translation of abstract of CN101533120.

(Continued)

*Primary Examiner* — Ismael Negron
(74) *Attorney, Agent, or Firm* — McClure, Qualey & Rodack, LLP

(57) ABSTRACT

The light guide plate includes a light guide plate body and a first medium, wherein the refractive index of the light guide plate body is greater than the refractive index of the first medium. The light guide plate body includes a plurality of gaps parallel with each other, wherein the first medium is disposed in those gaps. The light guide plate body further includes a light entrance end, wherein the gaps extend in directions both away and toward the light entrance end. Furthermore, an active region is defined on the light guide plate body and the gaps are located in the active region.

27 Claims, 15 Drawing Sheets

(56) References Cited

U.S. PATENT DOCUMENTS

| | | | |
|---|---|---|---|
| 8,517,592 B2* | 8/2013 | Shimizu | 362/621 |
| 2008/0084709 A1* | 4/2008 | Li et al. | 362/616 |
| 2008/0130314 A1* | 6/2008 | Liu et al. | 362/616 |
| 2008/0151577 A1* | 6/2008 | Li | 362/620 |
| 2008/0252818 A1* | 10/2008 | Wu et al. | 349/65 |
| 2009/0021960 A1 | 1/2009 | Yeh et al. | |
| 2009/0231882 A1 | 9/2009 | Lin et al. | |
| 2010/0134403 A1* | 6/2010 | Chi et al. | 345/102 |
| 2011/0025730 A1* | 2/2011 | Ajichi | 345/690 |

FOREIGN PATENT DOCUMENTS

| | | |
|---|---|---|
| CN | 101788128 A | 7/2010 |
| EP | 2258976 A1 | 12/2010 |
| TW | 567294 | 12/2003 |
| TW | I226954 | 1/2005 |
| TW | I263011 | 10/2006 |
| TW | I264601 | 10/2006 |
| TW | M325578 | 1/2008 |
| TW | M343865 | 11/2008 |

OTHER PUBLICATIONS

English translation of abstract of TW 567294.
English translation of abstract of CN 101788128 A.
English translation of abstract of TW M343865.
English translation of abstract of TW I263011.
English translation of abstract and cited portions of the specification of CN 101165515 A (published Apr. 23, 2008).
Taiwan Office Action dated Sep. 16, 2013.
English translation of abstract and cited portions of the specification of EP 2258976 A1 (published Dec. 8, 2010).

* cited by examiner

BACKLIGHT MODULE WITH LIGHT GUIDE PLATE HAVING OPTICALLY SEPARATED LIGHT GUIDE BODY

BACKGROUND OF THE INVENTION

1. Field of the Invention

This invention relates to a side-lighting light guide plate and a side-lighting backlight module, specifically to a local dimming side-lighting light guide plate and a local dimming side-lighting backlight module.

2. Description of the Prior Art

Display panels and flat displays using the display panels are now the mainstream of the display devices. In addition, the liquid crystal displays are the mainstream of the flat displays and are extensively used in various types of electronic products such as display screens, home televisions, monitors for personal computers and laptop computers, display screens of mobile phones and digital cameras.

The backlight module is one of the key components of the conventional liquid display panels. The liquid crystal itself does not generate light and a backlight module is used to provide adequate and evenly distributed luminance for the liquid crystal display panel to display images properly. The conventional backlight module uses only a single light guide plate to guide the light generated by the light sources, wherein the luminance at different portions of the light guide plate is substantially equal. However, in order to improve the visual effect of the displayed images, the backlight module should be able to present luminance of different magnitudes at different portions of the light guide plate.

As for the conventional direct-lighting backlight module, the light sources are disposed directly below the display panel. In this way, the direct-lighting backlight module only needs to drive the light source below the portion of the light guide plate needing luminance and close other light sources to achieve the desired contrast of the display image. However, for the side-lighting backlight module, light generated by the light sources enters the light guide plate and then disperses as the moving distance increases. In other words, the light guide plate cannot limit the light in one particular region. In this way, the conventional side-lighting backlight module cannot achieve the desired contrast by driving and closing the light sources like the conventional direct-lighting backlight module.

FIG. 1 is an exploded view of a conventional side-lighting backlight module 10. As FIG. 1 shows, the side-lighting backlight module 10 includes a reflector 11, a light guide plate 40, a light source set 50, wherein the light source set 50 is disposed at two sides of the light guide plate 40.

In the embodiment illustrated in FIG. 1, the light source set 50 includes a plurality of light sources 51, wherein the light sources 51 can be light emitting diodes. Similarly, different portions of the light guide plate 40 are defined by the light sources 51 as a plurality of light areas, wherein each light area of the light guide plate 40 corresponds to one or more different light sources 51. The light source 51 thus can be selectively driven to provide the corresponding light area with the required luminance.

As FIG. 1 shows, an upper structure layer 41 is disposed on the surface of the light guide plate 40. The upper structure layer 41 includes a plurality of prisms 41a, wherein the prism 41a extends from one side of the light guide plate 40 near the light source set 50 toward the opposite side near another light source set 50. The extending direction of the prism 41a is parallel with the travelling direction of the light emitted by the light source set 50. In this way, lights generated by the light source set 50 travel in the extending direction of the prism 41a toward the opposite sides of the light guide plate 40 and will not greatly disperse in other directions. This helps with the control of luminance in light areas. For this reason, the extending directions of the prisms 41a are substantially parallel, but are not limited thereto; in different embodiments, an angle can be included between the extending direction of the prisms 41a and the extending direction of the light.

A microstructure layer is disposed at the bottom of each light area of the light guide plate 40 for destroying the total reflections of the lights so that those lights can eventually emit from the surface of the light guide plate 40 that is disposed with the upper structure layer 41.

However, the light guide plate 40 is integrally formed into one piece by same material. There is thus no other structure or material for blocking light generated by adjacent light sources 51. In this way, only a portion of the light generated by the light source set 50 will travel in a direction parallel with the extending direction of the prisms 41a. Other portions of the light will disperse in different directions and is eventually affected by the microstructure layer and then emit from the surface of the light guide plate 40 corresponding to other light areas. In other words, the light guide plate 40 cannot limit the light generated by a particular light source 51 within a specified region and therefore the conventional side-lighting backlight module 10 cannot improve the contrast by selectively driving light sources 51.

The conventional side-lighting backlight module 10 mentioned above can still use a V-shaped structure layer 41 and the microstructure layer corresponding to the light areas to achieve local dimming and improve the contrast of the displayed images. However, this design still cannot effectively eliminate the problem of light leakage to the adjacent light areas mentioned above.

SUMMARY OF THE INVENTION

It is an objective of the present invention to provide a local dimming side-lighting light guide plate and a local dimming side-lighting backlight module for the correspondingly display to selectively lighten different areas of the display.

It is another objective of the present invention to provide a local dimming side-lighting light guide plate and a local dimming side-lighting backlight module to increase the contrast of the corresponding display panel.

It is yet another objective of the present invention to provide a local dimming side-lighting light guide plate and a local dimming side-lighting backlight module to decrease the energy usage of the corresponding display panel.

The present invention relates to a local dimming side-lighting light guide plate and a local dimming side-lighting backlight module. The light guide plate of the present invention includes a light guide plate body and a plurality of first mediums, wherein the refractive index of the light guide plate body is greater than the refractive index of the first medium. The light guide plate body includes a plurality of gaps parallel with each other, wherein the first mediums are disposed in the gaps. The light guide plate body further includes a light entrance end, wherein the gaps extend in directions perpendicular to the light entrance end. Furthermore, an active region is defined on the light guide plate body and the gaps are located within the active region.

The light guide plate includes a plurality of light guide blocks and a plurality of connection blocks. The light guide blocks are arranged side by side and the gap is located between two adjacent light guide blocks. Two ends of the connection block are connected to two adjacent light guide blocks. Furthermore, the light guide block and the connection block can be made of materials of different refractive indexes. In addition, the width of the first medium corresponding to the top of the light guide plate body is greater than the width of the first medium corresponding to the bottom of the light guide plate body, wherein the first medium has a shape of triangle or trapezium.

In a different embodiment, the light guide plate further includes a second medium, wherein the first medium and the second medium are disposed in the same gap. The first medium and the second medium contact different portions of the light guide plate body and have different refractive indexes.

DETAILED DESCRIPTION OF THE PREFERRED EMBODIMENT

The present invention relates to a side-lighting light guide plate and a side-lighting backlight module, specifically to a local dimming side-lighting light guide plate and a local dimming side-lighting backlight module.

Figure 1:
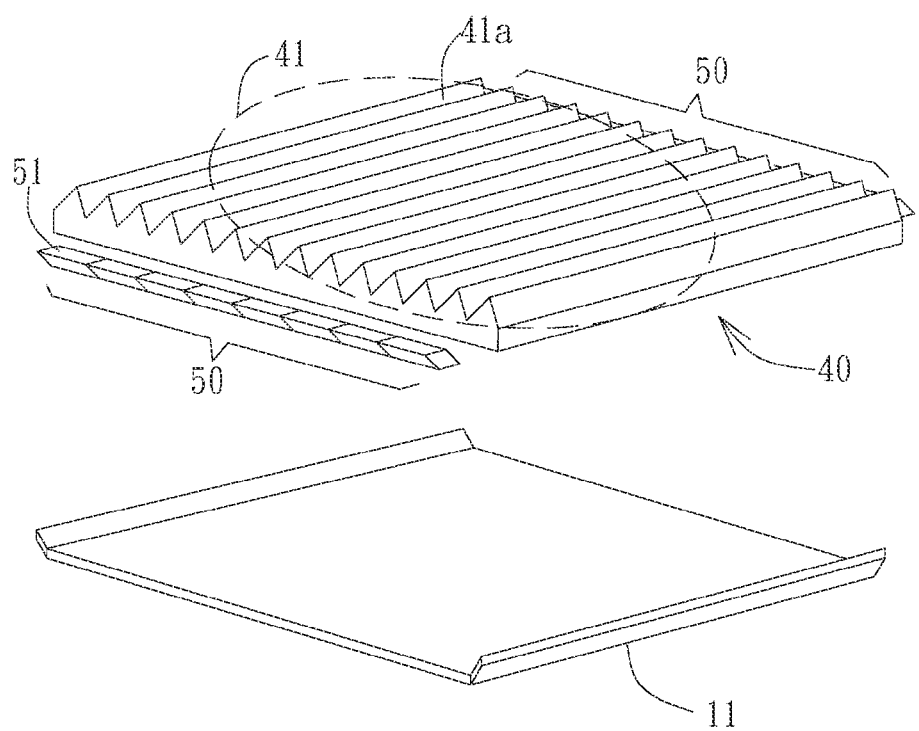
FIG. 1 is an exploded view of a conventional side-lighting backlight module.
Figure 2:
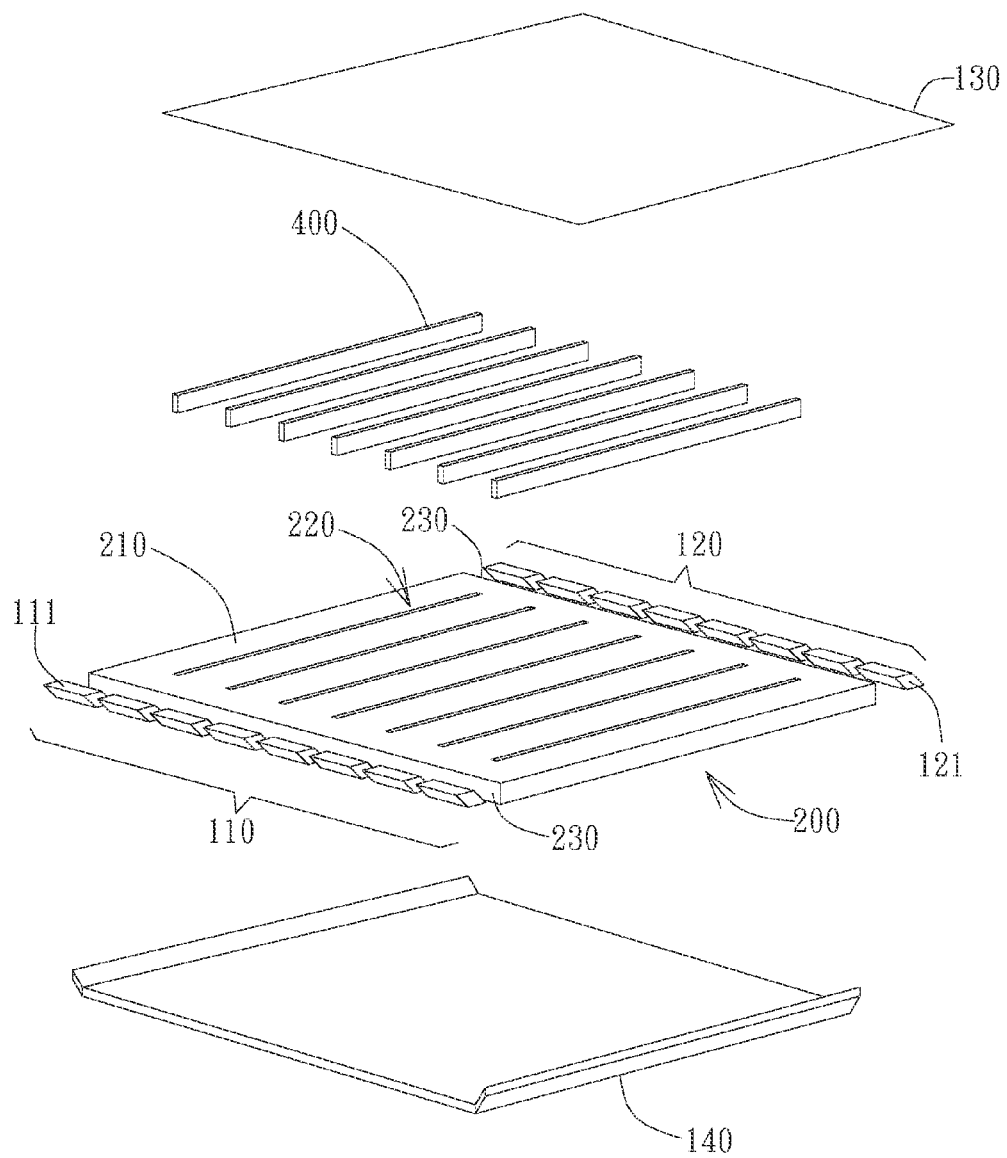
FIG. 2 is an exploded view of the local dimming side-lighting backlight module of the present invention.

FIG. 2 is an exploded view of the local dimming side-lighting backlight module 100 of the present invention. In the present embodiment, the backlight module 100 includes a first light source set 110, a second light source set 120, a diffusion film 130, a reflector 140, and a light guide plate 200, wherein the first light source set 110 and the second light source set 120 are disposed at two opposite sides of the light guide plate 200. Furthermore, the diffusion film 130 and the reflector 140 can be optionally included in the backlight module 100 to provide the desired optical effects.

Furthermore, the backlight module 100 preferably includes the diffusion film 130 disposed on one side of the light guide plate 200 opposite to the reflector 140, wherein the diffusion film 130 processes the light emitted from the light guide plate 200 in order to compensate for the optical defects created by tolerances of the light guide plate 200 or environmental influence (such as particle pollution). In other words, the diffusion film 130 of the present embodiment is used to prevent frictions of the light guide plate and compensate for the optical defects created by tolerances of the light guide plate 200 and the environmental influences.

In the embodiment illustrated in FIG. 2, the first light source set 110 and the second light source set 120 include a plurality of first light sources 111 and a plurality of second light sources 121 respectively, wherein the first light sources 111 and the second light sources 121 are light emitting diodes. Different portions of the light guide plate 200 can be defined as a plurality of light areas, wherein each of the light area is located between two adjacent gaps 220 and corresponds to different first light sources 111 or different second light sources 121. In this way, the first light source 111 and the second light source 121 can be driven to provide the corresponding light area with the required luminance/light.

In the embodiment illustrated in FIG. 2, the light guide plate 200 includes a light guide plate body 210 and a plurality of first mediums 400. The light guide plate body 210 includes a plurality of gaps 220 for accommodating the first mediums 400 and light entrance ends 230, wherein the first medium 400 can be air within the gaps 220. Furthermore, the refractive index of the light guide plate body 210 is greater than the refractive index of the first medium 400. In the present embodiment, the first light source set 110 and the second light source set 120 are disposed near two light entrance ends 230 opposite to each other and emit light toward the light guide body 210, but are not limited thereto. In other preferred embodiments, the backlight module 100 of the present invention can also dispose the light sources near only one light entrance end 230. In the embodiment illustrated in FIG. 2, the first medium 400 fills the gap 220 and contacts the light guide plate body 210. Therefore the first medium 400 will contact the light guide plate body 210 within the gap 220. Furthermore, the first medium 400 of the present embodiment can be made of polymethylmethacrylate (PMMA), but is not limited thereto; in different embodiments, the first medium 400 can be air or made of other materials with refractive index greater than the refractive index of the light guide plate body 210.

Figure 3A:
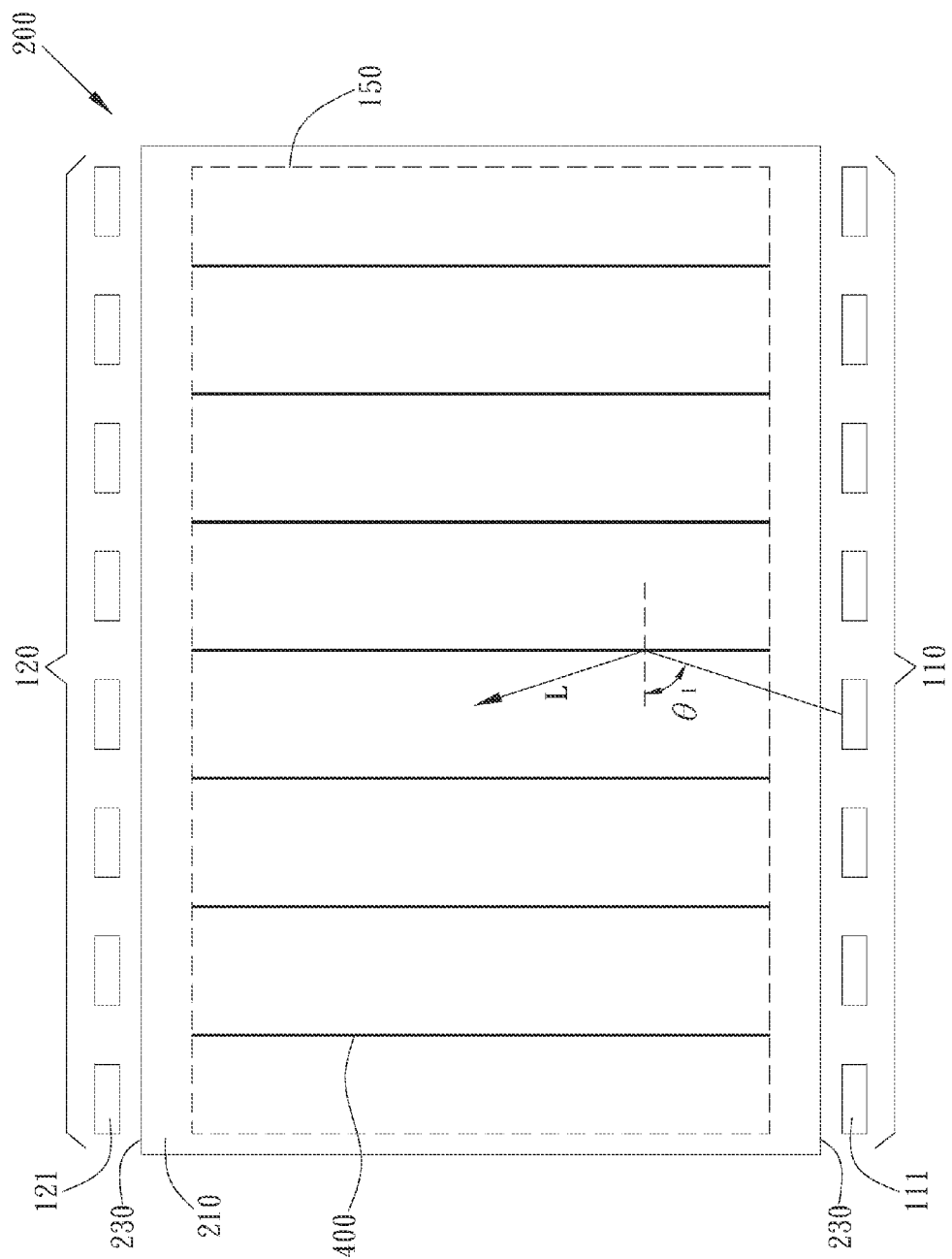
FIG. 3A is a plane view of the light guide plate of the present invention.

Here please refer to FIG. 3A for the explanation of the working principle of the backlight module 100. According to Snell's Law, when light travelling from an optically dense material (with larger refractive index n1) to a material with smaller refractive index n2, such as travelling from water to air, if the light incident angle $\theta_1$ is equal to a critical angle $\theta_c$, then the refracted light will travel alone the boundary between two materials, i.e. the refracted angle $\theta_2$ is 90°.

If the incident angle $\theta_1$ is greater than the critical angle $\theta_c$ and the sine of the incident angle $\sin \theta_1$ is greater n2/n1 (i.e. $\sin \theta_1 > n2/n1$), then the sine of the refracted angle $\sin \theta_2$ is greater than 1 (i.e. $\sin \theta_2 > 1$). However, $\sin \theta_2 > 1$ does not exist and therefore light is not refracted but reflected back to the optically dense material. In other words, a total internal reflection of light occurs within the optically dense material. In addition, the critical angle is the smallest incident angle that the total internal reflection will occur and is dependent on the ratio of refractive index between two materials, i.e. $\theta_c = \arcsin(n2/n1)$. For instance, the refractive index of water is 1.33 and the refractive index of air is close to 1.00 and therefore the critical angle $\theta_c$ for light travelling from water to air is arcsin(1/1.33)=48.8°.

In the present embodiment, the refractive index of the light guide plate body 210 is greater than the refractive index of the first medium 400, wherein the light guide plate body 210 is preferably made of materials with refractive index between 1.4 and 1.7. The first medium 400 is preferably made of materials with refractive index between 1.1 and 1.39. In this way, the critical angle $\theta_c$ for lights travelling within the light guide plate body 210 and making contact with the first medium 400 is arcsin(1.39/1.7)=54.80°. In other words, when the incident angle $\theta_1$ of the first light L illustrated in FIG. 3A is controlled to be greater than 54.80°, then the first light L will be reflected by the first medium 400. At this moment, the first light L will not enter the first medium 400 and will travel within the light guide plate body 210 in a form of total internal reflection.

In this way, lights emitted by the first light source 111 and the second light source 121 will be limited within the corresponding portion of light guide plate body 210. In other words, the backlight module 100 of the present invention can use the critical angle $\theta_c$ between the light guide plate body 210 and the first medium 400 as well as the incident angle $\theta_1$ of lights making contact with the first medium 400 to achieve local dimming.

Figure 3B:
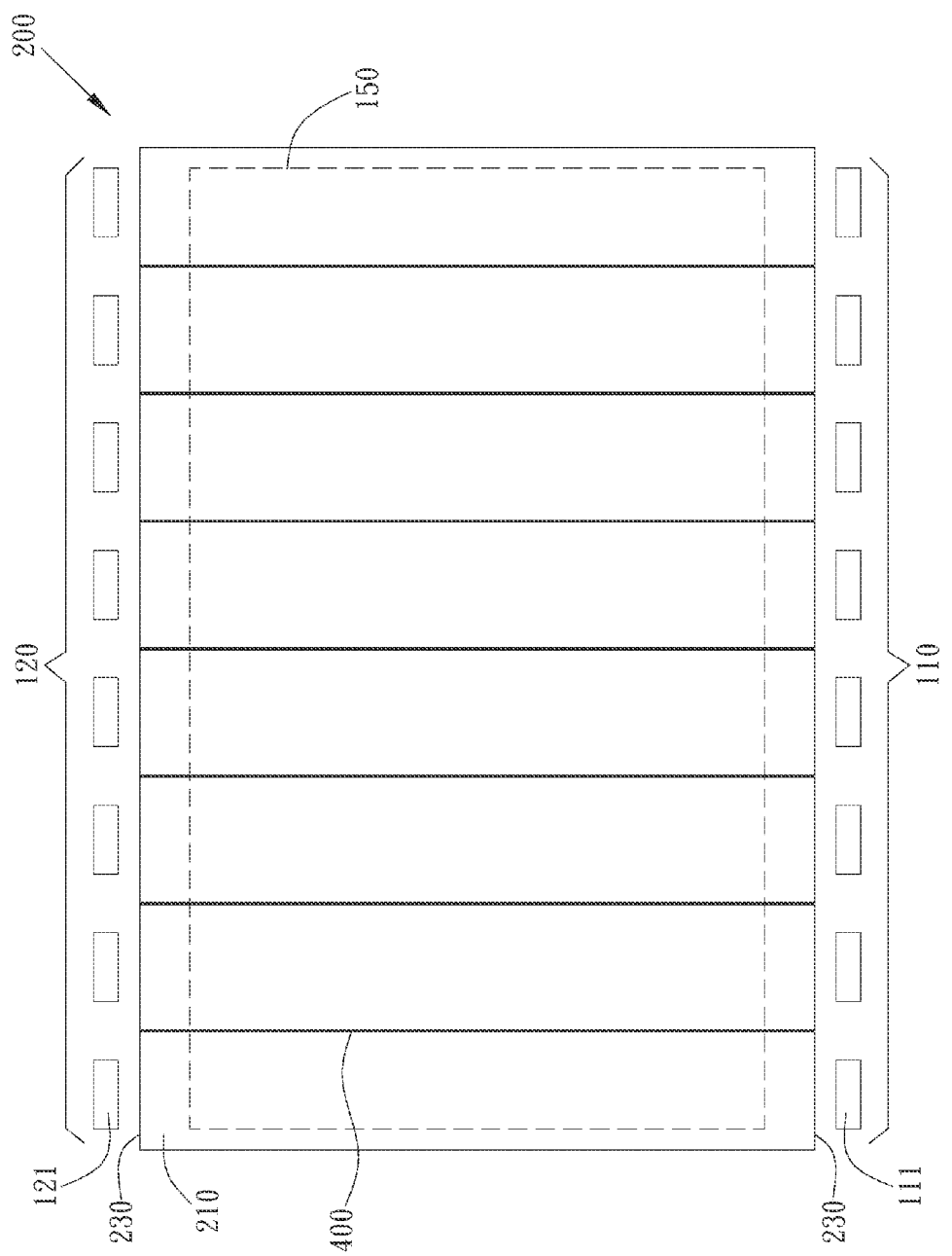
FIG. 3B is a plane view of a variation of the light guide plate illustrated in FIG. 3A.

FIG. 3A is a plane view of the light guide plate 200 of the present invention, wherein an active region 150 is defined on the light guide plate body 210. In the present embodiment, the active region 150 defined on the light guide plate body 210 corresponds to an active area on a display panel (not illustrated), but is not limited thereto; in different embodiments, the area of the active region 150 can be greater than the above-mentioned active area. Furthermore, a microstructure layer (not illustrated) is disposed at the bottom of the light guide plate body 210 opposite to the active region 150, wherein the microstructure layer is used to destroy the total reflection of the lights emitted by the first light sources 111 and the second light sources 121 so that those lights can eventually emit from one side of the light guide plate body 210 opposite to the microstructure layer. As FIG. 3A shows, the gaps 220 on the light guide plate body 210 for accommodating the first mediums 400 are preferably located within the active region 150, but are not limited thereto. In the embodiment illustrated in FIG. 3B, the gaps 220 can also extend from the light entrance end 230 to the other light entrance end 230 on the opposite side of the light guide plate body 210. In the present embodiment, a plurality of connection blocks (not illustrated) are defined at the bottom of the light guide plate body 210 corresponding to the gaps 220 and making contact with the first medium 400. The connection block is used to connect portions of the light guide plate body 210 located at two opposite sides of the first medium 400 and also forms the gap 220 to accommodate the first medium 400.

As FIG. 3A shows, the first light source set 110 and the second light source set 120 are disposed near the light entrance ends 230. In the present embodiment, the widths of first light source 111 and the second light source 121 are preferably smaller than the distance between two adjacent gaps 220, but are not limited thereto; in different embodiments, the widths of the first light source 111 and the second light source 121 can be greater than the distance between two adjacent gaps 220. The first light sources 111 or the second light sources 121 having width greater than the distance between adjacent gaps 220 can be spaced apart from each other and disposed near the light entrance end 230.

Figure 3C:
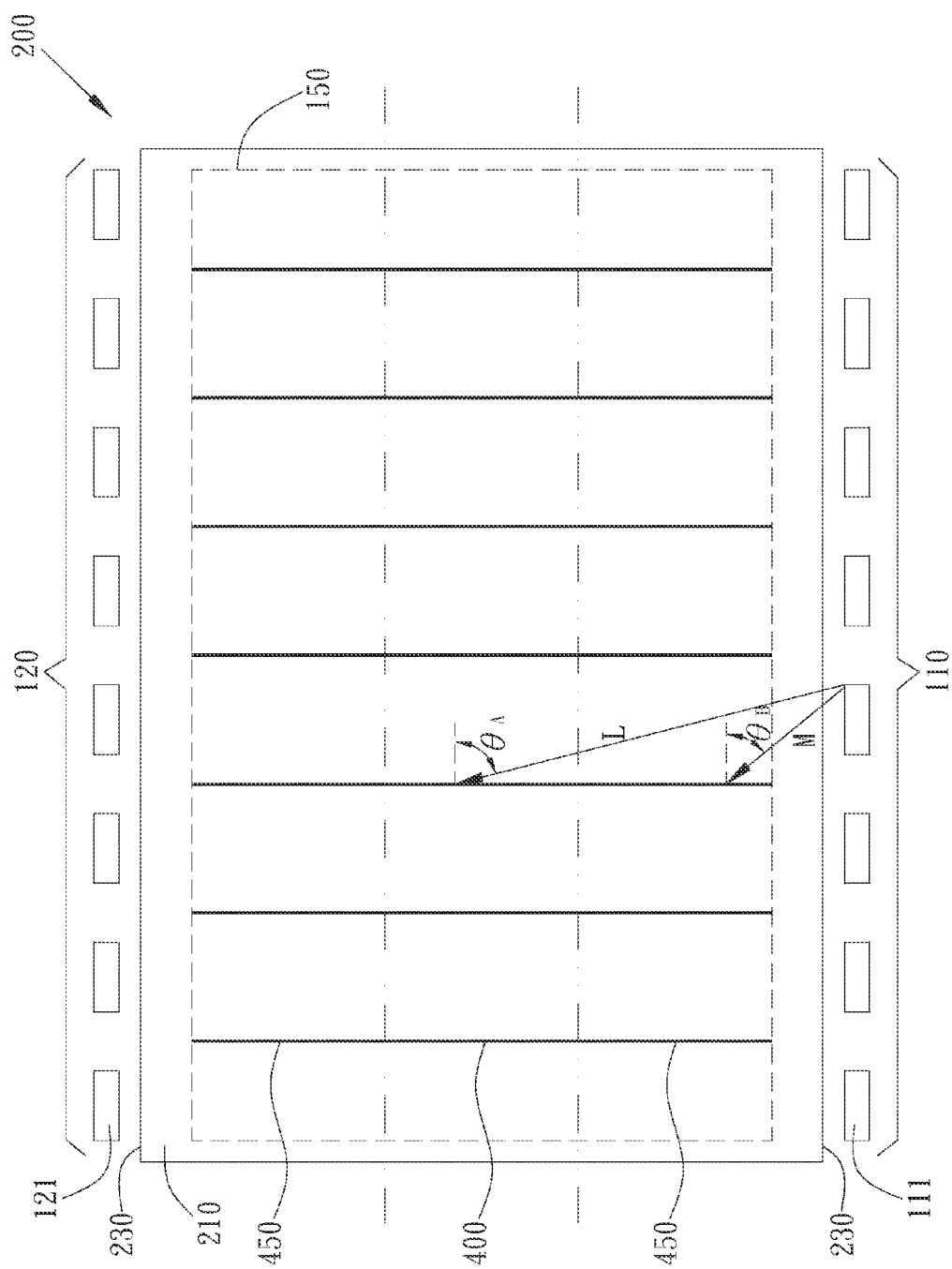
FIG. 3C is a plane view of another variation of the light guide plate illustrated in FIG. 3A.

FIG. 3C is a plane view of a variation of the light guide plate 200 of the present invention. In the present embodiment, a second medium 450 is also disposed in the gap 220 on the light guide plate 200, wherein the refractive index of the first medium 400 is smaller than the refractive index of the second medium 450. The first medium 400 and the second medium 450 occupy different portions of one gap 220. In other words, the first medium 400 and the second medium 450 contact different portions of the light guide plate body 210.

In the embodiment illustrated in FIG. 3C, the first medium 400 is disposed in the centre portion of the gap 220 while the second mediums 450 are disposed in the portions of the gap 220 near the first light source 111 and the second light source 121. In this way, the incident angle of light contacting the first medium 400 is greater than the incident angle of light contacting the second medium 450. Furthermore, the refractive index of the first medium 400 is smaller than the refractive index of the second medium 450 and therefore the critical angle between the light guide plate body 210 and the first medium 400 is smaller than the critical angle between the light guide plate body 210 and the second medium 450. In this way, even if the incident angle of lights on the first medium 400 and the incident angle of lights on the second medium 450 are different, the light guide plate 200 can still use the difference in refractive index between the two mediums to limit the lights within the corresponding light area of the light guide plate body 210.

For instance, in the embodiment illustrated in FIG. 3C, the first light L and the second light M generated by the first light source 111 left the first light source 111 at different angles. The first light L makes contact with the first medium 400 at a first incident angle $\theta_A$ while the second light M makes contact with the second medium 450 at a second incident angle $\theta_B$. In the embodiment illustrated in FIG. 3C, the first incident angle $\theta_A$ is greater than the second incident angle $\theta_B$. However, the critical angle between the light guide plate body 210 and the first medium 400 is smaller than the first incident angle $\theta_A$. The critical angle between the light guide plate body 210 and the second medium 450 is smaller than the second incident angle $\theta_B$. In this way, the first medium 400 and the second medium 450 can effectively reflect the first light L and the second light M back to the light guide plate body 210.

Figure 4:
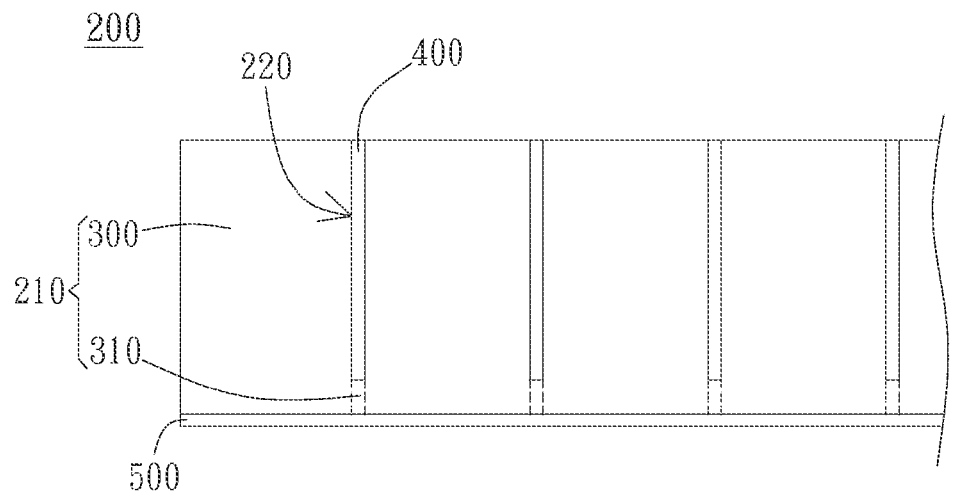
FIG. 4 is a cross-sectional view of the light guide plate illustrated in FIG. 3A.

FIG. 4 is a cross-sectional view of the light guide plate 200 illustrated in FIG. 3A. As FIG. 4 shows, a plurality of light guide blocks 300 and a plurality of connection blocks 310 are defined in the light guide plate body 210, wherein the light guide blocks 300 are arranged side by side and parallel with each other. On the other hand, two ends of the connection block 310 are connected to the adjacent light guide blocks 300, so that a gap 220 is formed between the adjacent light guide blocks 300 and within the active region 150 as illustrated in FIG. 3A to accommodate the first medium 400.

As FIG. 4 shows, the connection block 310 is located below the first medium 400 and connected to the adjacent light guide blocks 300. In other words, the first medium 400 is disposed in the gap 220 between adjacent light guide blocks 300 and above the connection block 310. Therefore the light guide block 300, the connection block 310, and the first medium 400 can be regarded as a plurality of blocks of the light guide plate, wherein the light guide blocks 300 and the first mediums 400 are blocks arranged side by side and parallel with each other.

Furthermore, the light guide plate 200 includes a plurality of microstructure layers 500, disposed at the bottom of the light guide plate body 210 to alter the paths of lights generated by the first light source 111 and the second light source 121, so that those lights can emerge from one side of the light guide plate body 210 opposite to the microstructure layer 500. In the present embodiment, the light guide plate 200 uses the microstructure layer 500 to alter the path of lights, but is not limited thereto; in different embodiments, the light guide plate 200 can use printed stripes, printed dots, raised bumps, raised dots, sunken stripes, sunken dots or a combination thereof to reflect or refract light. Furthermore, the dotted structure mentioned above can have shape of a circle, an oval or other figures.

In the embodiment illustrated in FIG. 4, the light guide block 300 and the connection block 310 are preferably made of the same material. In other words, the light guide block 300 and the connection block 310 are preferably integrally formed as one piece. The light guide block 300 and the connection block 310 have the same refractive index and therefore a portion of lights emitted by the first light source 111 and the second light source 121 will pass through the connection block 310 and move toward adjacent light guide blocks 300. At least a portion of lights will be broken by the microstructure layer 500 and emerge from one side of the light guide plate 200 opposite to the microstructure layer 500. In this way, light emerging from the connection block 310 will smooth out the luminance of the corresponding area and prevent the occurrence of dark stripes from appearing on the location corresponding to the first medium 400.

Furthermore, in the embodiment illustrated in FIG. 4, the ratio of width between the first medium 400 and the connection block 310 is preferably 6:1, but is not limited thereto; in different embodiments, the ratio of width between the first medium 400 and the connection block 310 can be adjusted based on the amount of light needed to pass through the connection block 310, the luminance of the light sources, and other factors. In this way, the light guide plate 200 of the present embodiment can control the luminance appearing on the location corresponding to the connection block 310 and prevent the occurrence of dark strips on the location corresponding to the first medium 400. Furthermore, the design in the present embodiment allows some light to pass through the boundary between adjacent light guide blocks 300 to blur the boundary and prevent the boundary between adjacent light guide blocks 300 from becoming visible.

Figure 5:
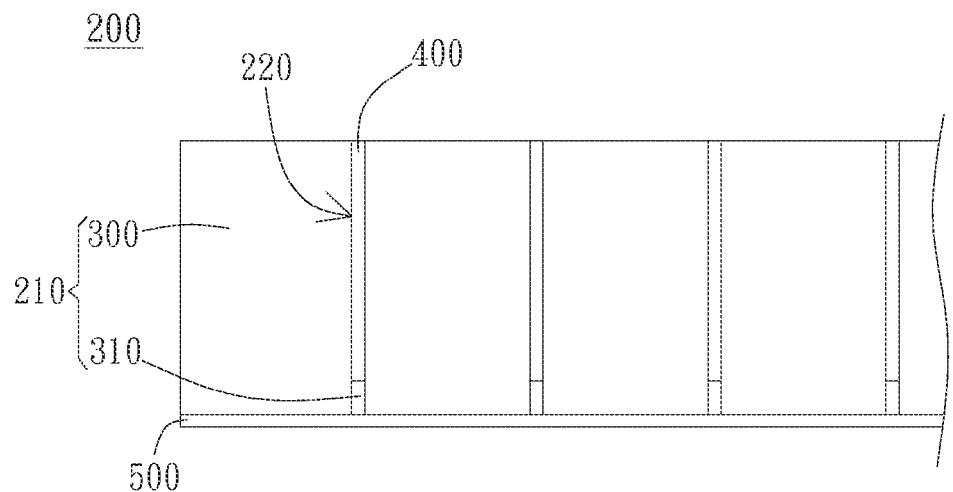
FIG. 5 illustrates a variation of the light guide plate illustrated in FIG. 4.

As mentioned above, in the embodiment illustrated in FIG. 4, the light guide block 300 and the connection block 310 are made of the same material. However, in a variation embodiment illustrated in FIG. 5, the light guide block 300 and the connection block 310 are made of different materials. Furthermore, the connection block 300 and the first medium 400 can be made of the same material. In this way, the connection block 310 and the first medium 400 can have the same refractive index and therefore the connection block 310 and the first medium 400 can reflect more lights generated by the first light source 111 and the second light source 121. Lights can be limited within the light guide block 300 and travel in a form of total internal reflection. Furthermore, the light guide block 300, the connection block 310, and the first medium 400 can be made of materials with different refractive indexes. The refractive index of the light guide block 300 is preferably greater than the refractive indexes of the connection block 310 and the first medium 400, wherein the refractive index of the connection block 310 is preferably greater than the refractive index of the first medium 400, but is not limited thereto.

Figure 6:
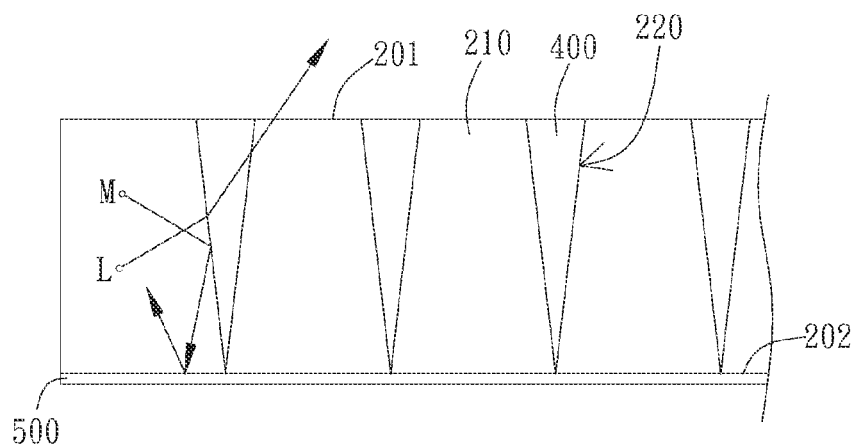
FIG. 6 is a cross-sectional view of another variation of the light guide plate.

FIG. 6 is a cross-sectional view of the light guide plate 200 in another embodiment of the present invention. In the present embodiment, the width of the first medium 400 near the top of the light guide plate 200 is greater than the width of the first medium 400 near the bottom of the light guide plate 200 and the microstructure layer 500. As FIG. 6 shows, two ends of the first medium 400 have different widths and therefore lights travelling in different directions will contact the first medium 400 at different incident angles. In this way, the incident angles of some lights will be smaller than the critical angle and those lights will pass through the top surface 201 of the light guide plate 200. On the other hands, some lights will be reflected back to the light guide block 300 because their incident angles are smaller than the critical angle, wherein those lights will then be broken by the microstructure layer 500 and eventually emit from the top of the light guide plate 200. In this way, those lights passing through the first medium 400 will harmonize the luminance on the area corresponding to the first medium 400 and prevent the occurrence of visible dark strip on the location of the first medium 400.

FIG. 6 illustrates a schematic view of a first light L and a second light M projected on the cross-section of the light guide plate 200, wherein the first light L and the second light M travel in a direction into the paper. As FIG. 6 shows, the first light L and the second light M travel in the light guide plate body 210 and contact the first medium 400 at different incident angles. In the present embodiment, the incident angle of the first light L when making contact with the first medium 400 is smaller than the critical angle between the light guide plate body 210 and the first medium 400. Therefore the first light L will pass through the first medium 400 and travel toward the top of the light guide plate body 210.

On the other hand, the incident angle of the second light M when making contact with the first medium 400 is greater than the critical angle between the light guide plate body 210 and the first medium 400. Thus the second light M is reflected by the first medium 400 back to the light guide plate body 210, broken by the microstructure layer 500, and then emit from the top of the light guide plate body 210.

Figure 7:
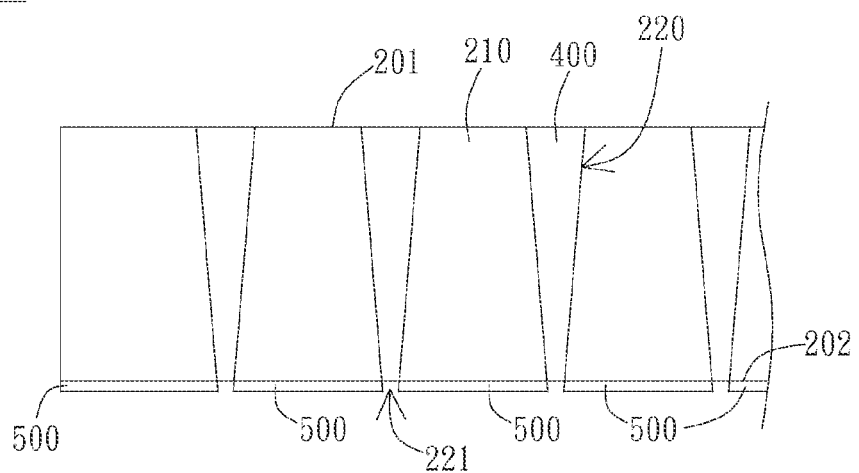
FIG. 7 is a cross-sectional view of a variation of the light guide plate illustrated in FIG. 6.

FIG. 7 is a cross-sectional view of a variation embodiment of the light guide plate 200 illustrated in FIG. 6. In the present embodiment, the first medium 400 is preferably a trapezoidal prism. In other words, the first medium 400 disposed in the gap 220 preferably has a trapezoidal side. In the present embodiment, the microstructure layer 500 is disposed on the bottom of the light guide plate body 210, wherein an interval 221 exists between adjacent microstructure layers 500. As FIG. 7 shows, the location of the interval 221 corresponds to the bottom of the first medium 400. In other words, the microstructure layer 500 is not disposed at the bottom of the first medium 400, but is not limited thereto. In different embodiments, the microstructure layer 500 can be optionally disposed at a portion of the bottom of the first medium 400.

Furthermore, in the embodiments illustrated in FIG. 6 and FIG. 7, the first medium 400 can be a triangular prism or a trapezoidal prism, but is not limited thereto; in different embodiments, the first medium 400 of the present invention can also be an oval prism, a circular prism, or other prisms with suitable shapes.

Figure 8:
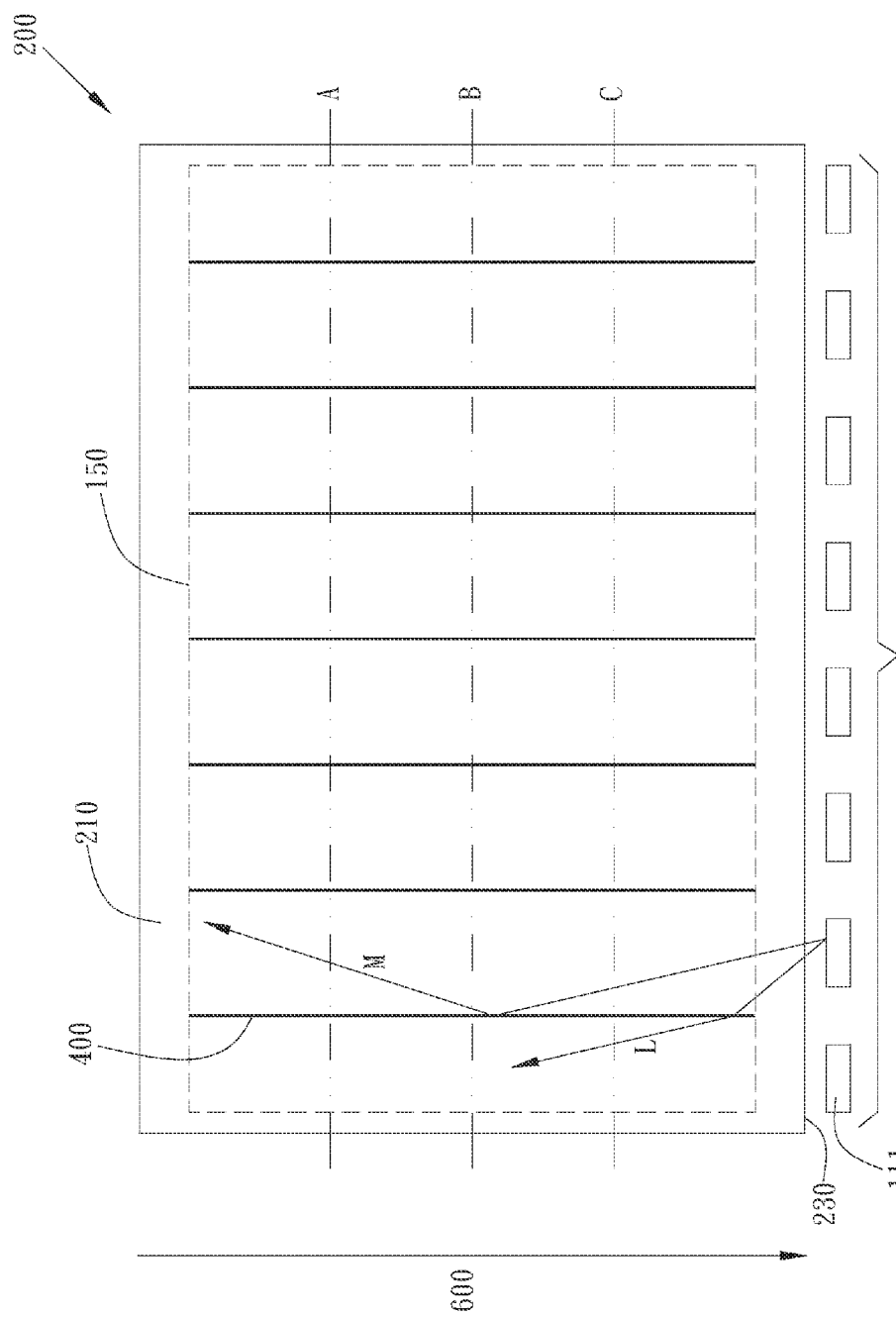
FIG. 8 is a plane view of another variation of the light guide plate illustrated in FIG. 6.

FIG. 8 is a plane view of a variation of the light guide plate 200 illustrated in FIG. 6, wherein the first light sources 111 are disposed at only one light entrance end 230 near the light guide plate body 210. As FIG. 8 shows, the first medium 400 extends along an extending direction 600 toward and away from the light entrance end 230. Furthermore, in the present embodiment, portions of the first medium 400 distributed along the extending direction 600 have different thickness (here please also refer to FIGS. 9A, FIG. 9B, and FIG. 9C).

Figure 9A:
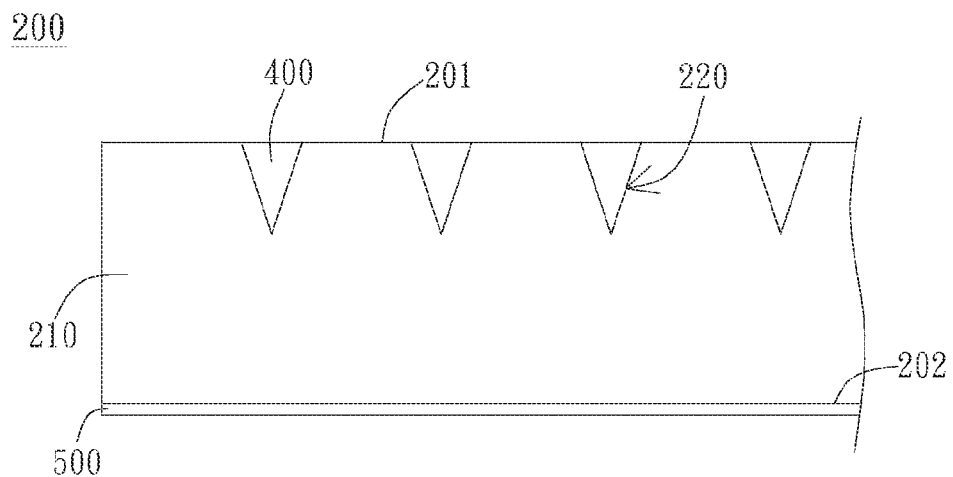
FIGS. 9A, 9B, and 9C are enlarged cross-sectional views of the light guide plate corresponding to the cross-section lines illustrated in FIG. 8.
Figure 9B:
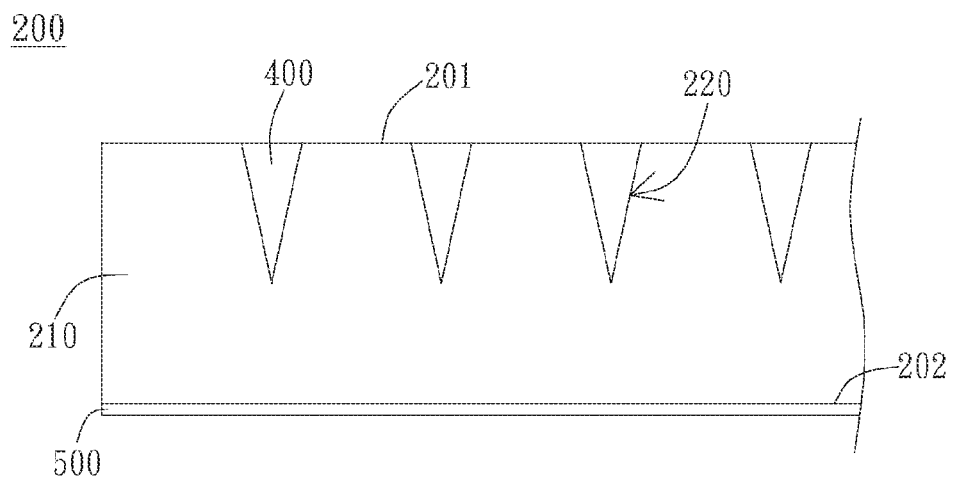
Figure 9C:
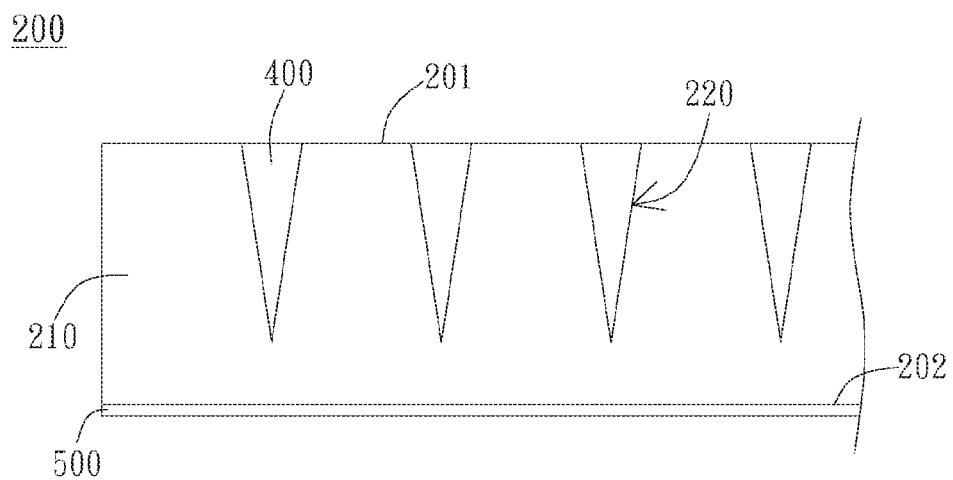

FIGS. 9A, 9B, and 9C are cross-sectional views corresponding to cross-section lines A, B, and C in FIG. 8. In the present embodiment, the thickness of the first medium 400 increases along the extending direction 600 toward the light entrance end 230. As FIGS. 9A, 9B, and 9C show, the thickness of the portion of the first medium 400 near the light entrance end 230 is greater than the thickness of the portion of the first medium 400 distant from the light entrance end 230. Furthermore, the incident angle smaller than the critical angle makes it easier for the first light L emitted by the first light source 111 to pass through the first medium 400 near the light entrance end 230 and eventually emit from the top surface of the light guide plate 200. In this way, the thicker portion of the first medium 400 near the light entrance end 230 can reflect more lights back to the light guide plate body 210. On the other hand, the incident angle greater than the critical angle makes it easier for the second light M generated by the first light source 111 to be reflected by the portion of the first medium 400 distant from the light entrance end 230 back to the light guide plate body 210. Therefore the thinner portion of the first medium 400 distant from the light entrance end 230 allows more lights to be broken by the microstructure layer 500 and emit from the top surface of the light guide plate body 210. In this way, the luminance of the light guide plate 200 is harmonized. In other words, the first medium 400 having increasing thickness can be used to harmonize the luminance of the backlight module 100 corresponding to the location of the first medium 400.

Figure 10A:
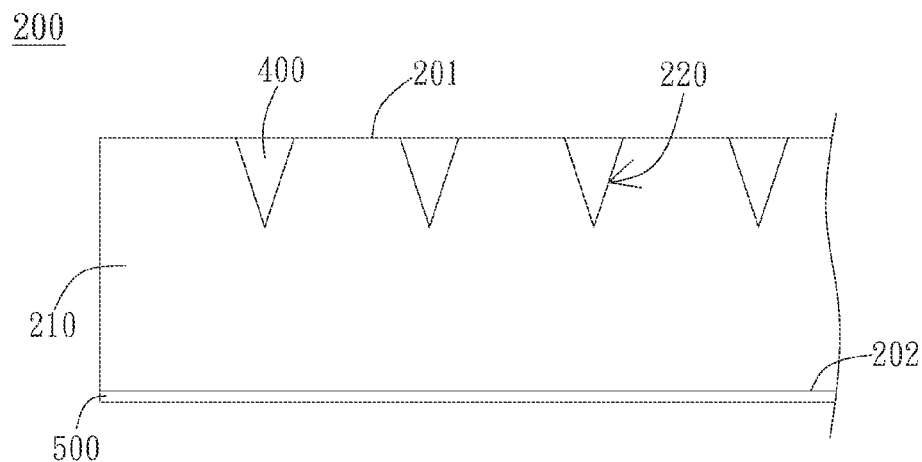
FIGS. 10A, 10B, 10C are enlarged cross-sectional views of a variation of the light guide plate illustrated in FIGS. 9A-9C.
Figure 10B:
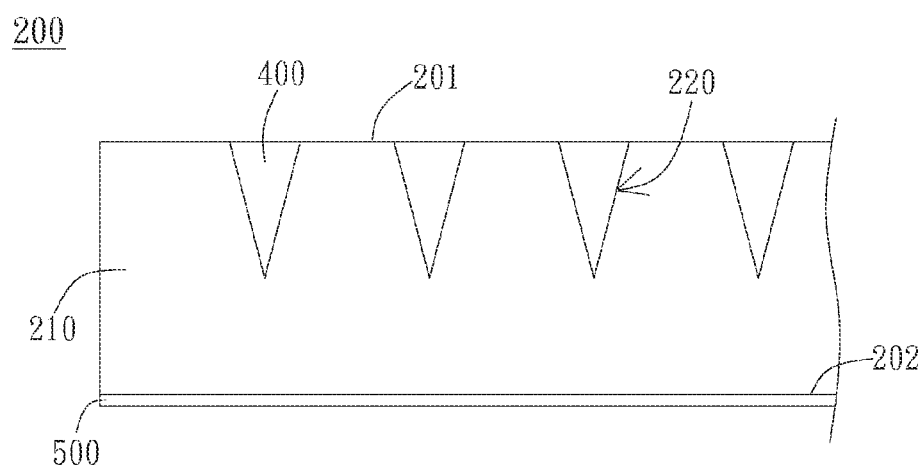
Figure 10C:
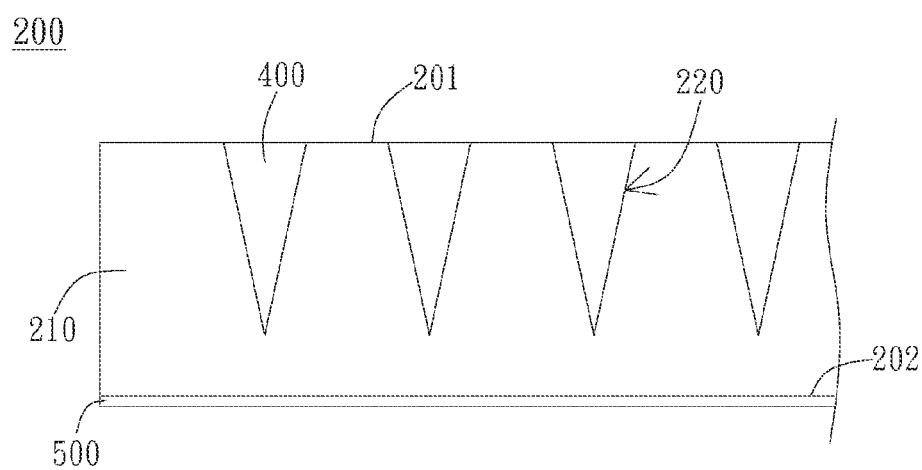

Furthermore, in the embodiment illustrated in FIGS. 9A, 9B, and 9C, the width of the first medium 400 corresponding to the top surface of the light guide plate 200 is substantially the same, but is not limited thereto. FIGS. 10A, 10B, and 10C illustrate a variation of the light guide plate 200 illustrated in FIGS. 9A to 9C, wherein the width of the first medium 400 corresponding to the top surface of the light guide plate 200 also increases along the extending direction 600 toward the light entrance end 230.

Figure 11:
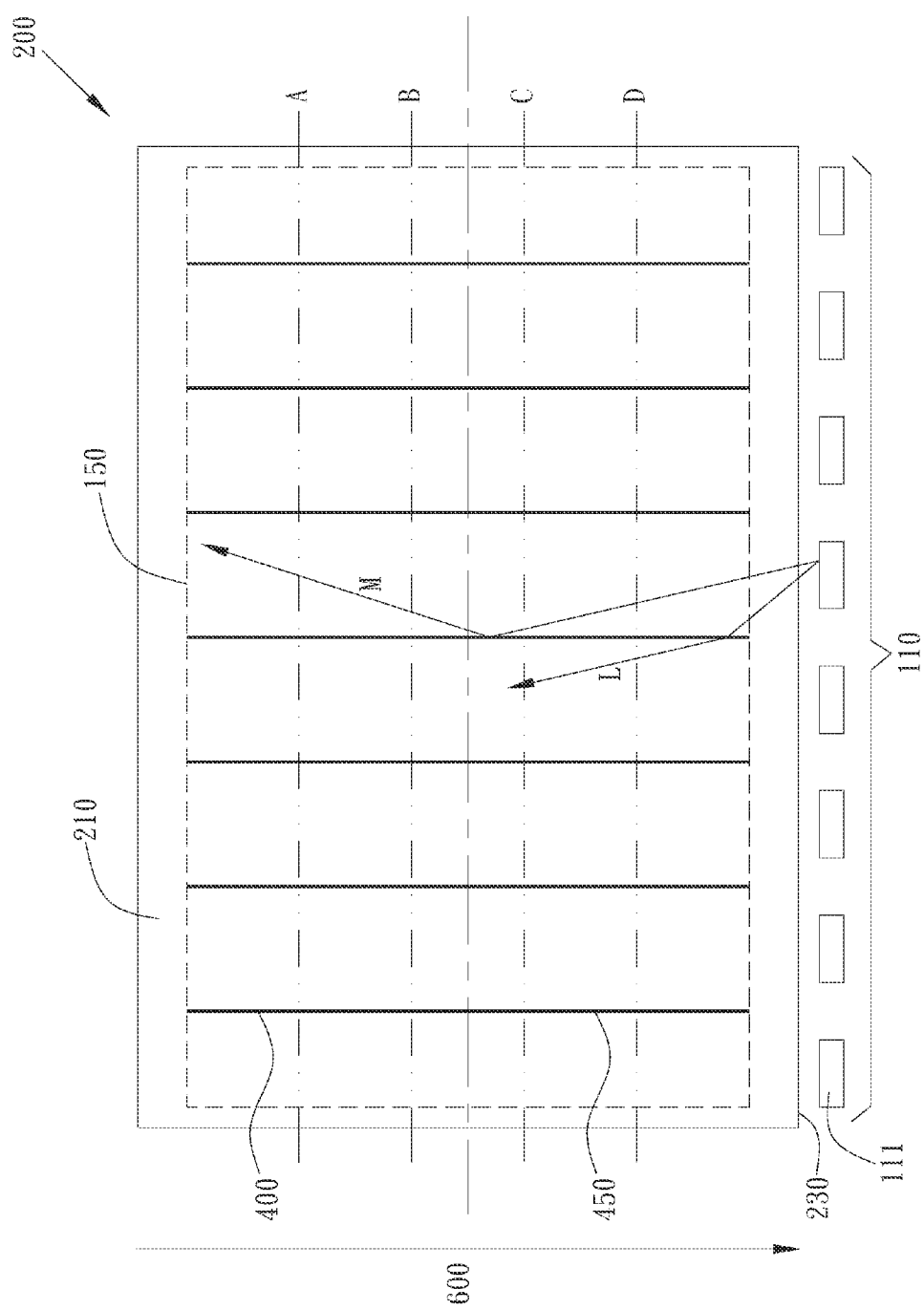
FIG. 11 is a variation of the light guide plate illustrated in FIG. 8.
Figure 12A:
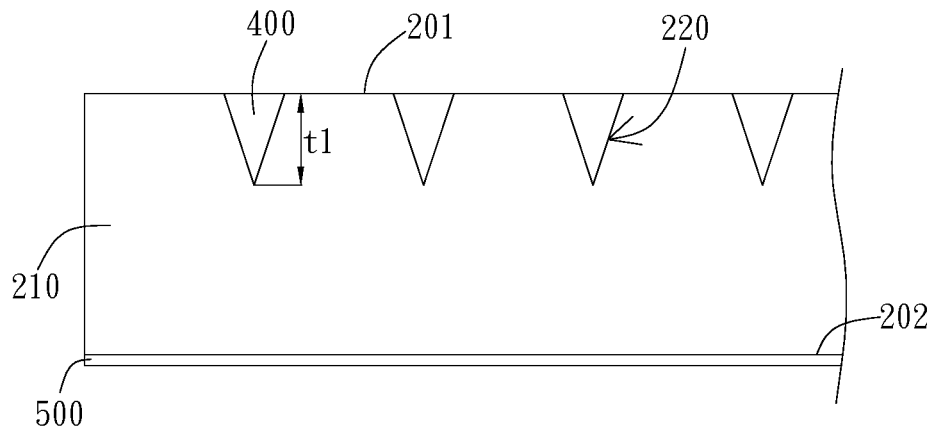
FIGS. 12A to 12D are enlarged cross-sectional views corresponding to the cross-section lines illustrated in FIG. 11.
Figure 12B:
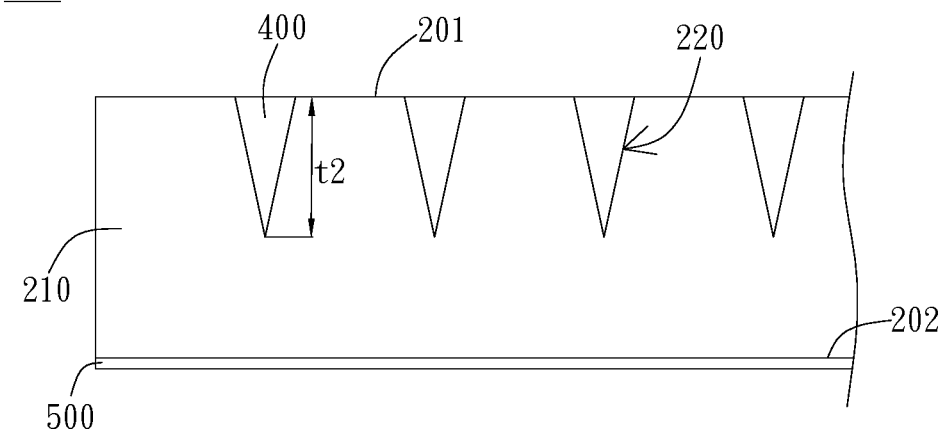
Figure 12C:
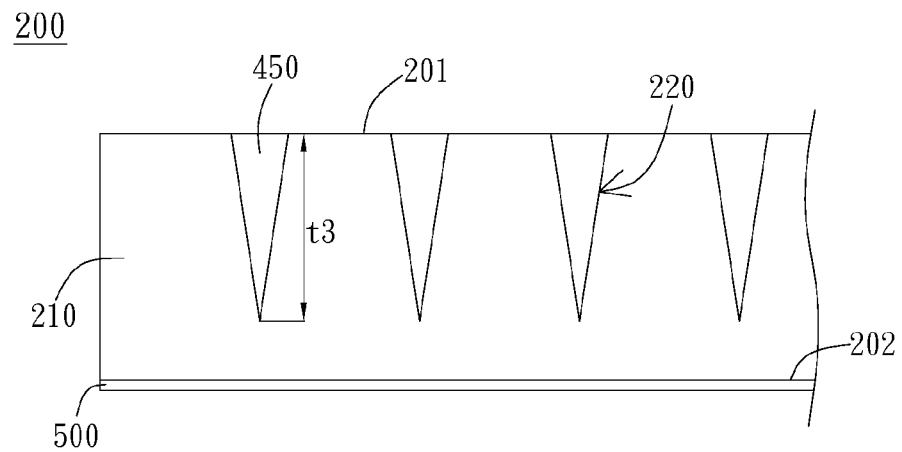
Figure 12D:
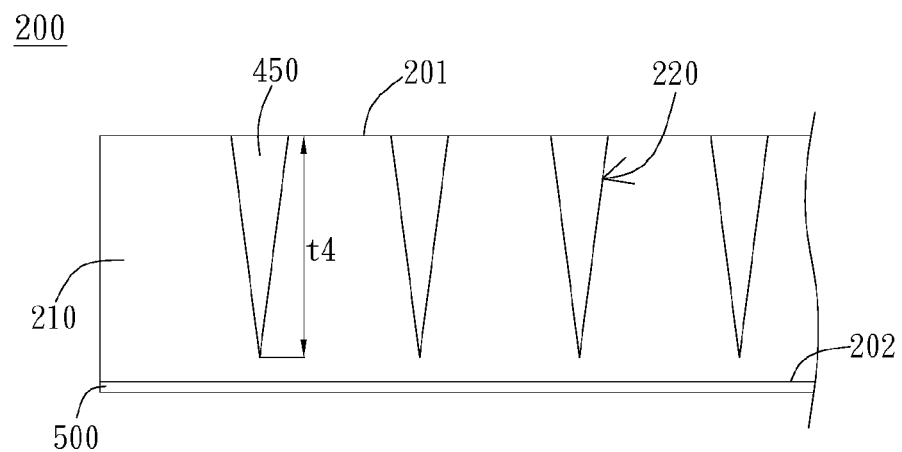
Figure 13A:
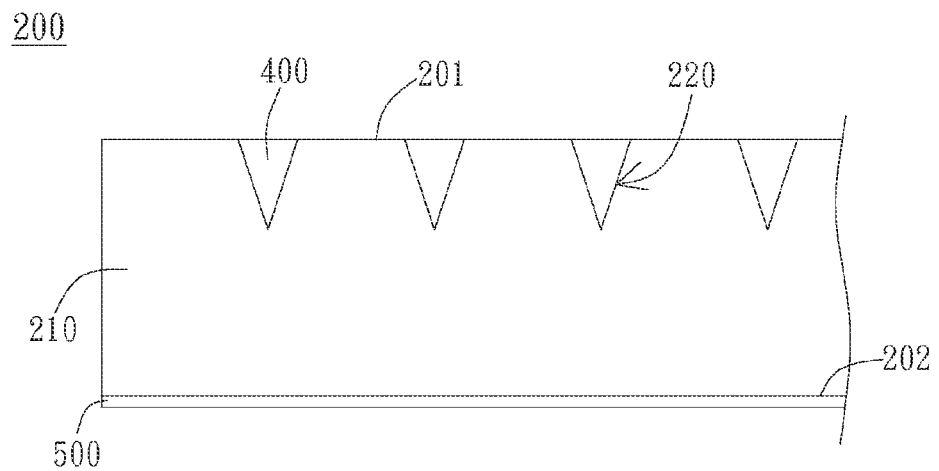
FIGS. 13A to 13D are enlarge cross-sectional views of a variation of the light guide plate illustrated in FIGS. 12A to 12D.
Figure 13B:
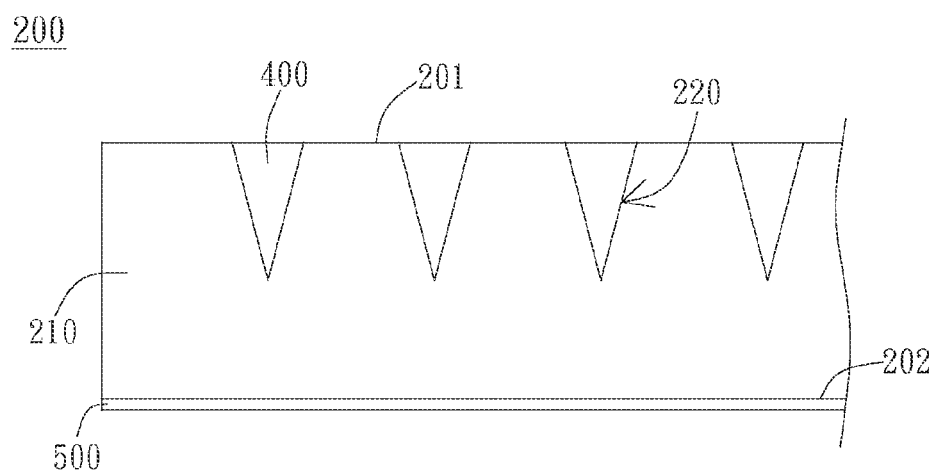
Figure 13C:
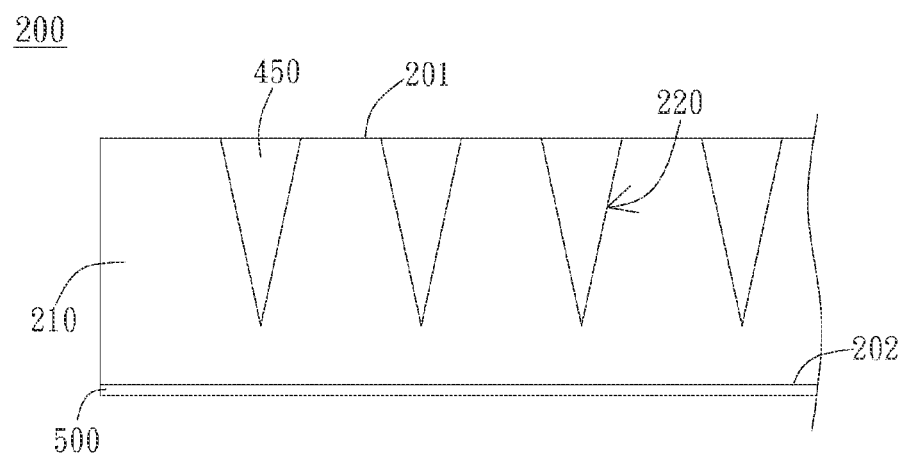
Figure 13D:
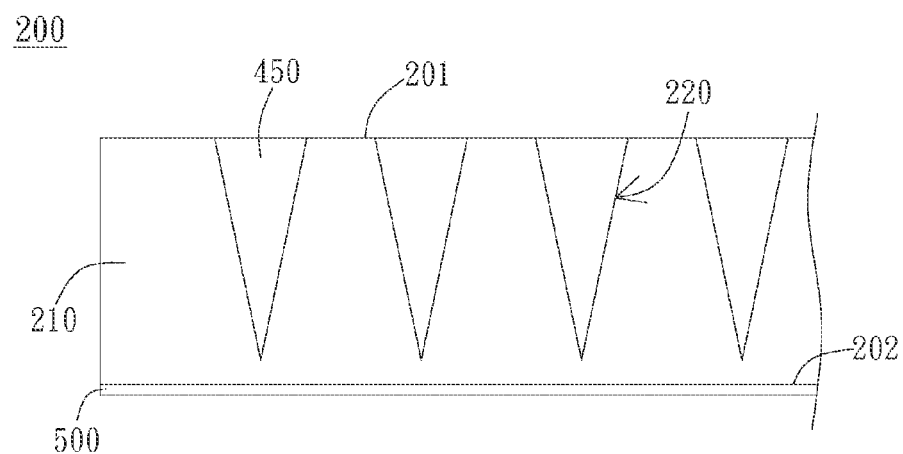

FIG. 11 illustrates a variation of the light guide plate 200 illustrated in FIG. 8. The light guide plate 200 of the present embodiment further includes a second medium 450 which is also disposed in the gap 220, wherein the second medium 450 is closer to the light entrance end 230 and the first light sources 111 than the first medium. In the embodiment illustrated in FIG. 11, the first medium 400 and the second medium 450 have the same extending direction 600. Furthermore, FIGS. 12A to 12D are the enlarged cross-sectional views corresponding to the cross-section lines A, B, C, and D illustrated in FIG. 10.

Here please refer to FIGS. 11 and FIGS. 12A to 12D. The thicknesses of the first medium 400 and the second medium 450 increases along the extending direction 600 toward the light entrance end 230. In the present embodiment, the thickness of the first medium 400 increases from one end of the extending direction 600 that is distant from the light entrance 230 toward the light entrance 230. On the other hand, the thickness of the second medium 450 increases from the connection between the first medium 400 and the second medium 450 toward the light entrance end 230. This shows that the width of every portion of the second medium 450 is greater than the first medium 400.

As mentioned above, the thickness of the second medium 450 is greater than the thickness of the first medium 400. Furthermore, the refractive index of the first medium 400 is smaller than the refractive index of the second medium 450. Therefore, the critical angle between the light guide plate body 210 and the first medium 450 is smaller than the critical angle between the light guide plate body 210 and the second medium 400. However, the incident angle of the first light L is smaller than the corresponding critical angle and therefore it is easier for the first light L emitted by the first light source 111 to pass through the second medium 450 near the light entrance end 230 and then emit from the top surface of the light guide plate 200. Thus the thicker second medium 450 near the light entrance end 230 allows more light to exit from the top surface of the light guide plate 200.

On the other hand, the incident angle of the second light M is greater than the corresponding critical angle and therefore it is easier for the second light M emitted by the first light source 111 to be reflected back to the light guide plate body 210 by the first medium 400 distant from the light entrance end 230. Therefore the amount of light passing through the thinner first medium 400 distant from the light entrance end 230 and reflected by the first medium 400 is substantially the same as the amount of light passing through the second medium 450 and reflected by the second medium 450. In this way, the luminance of the light guide plate 200 near the first medium 400 and the second medium 450 are harmonized. In other words, the increase in thicknesses of the first medium 400 and the second medium 450 in the direction toward the light entrance end 230 can be used to harmonize the luminance of the backlight module 100 corresponding at the locations of the first medium 400 and the second medium 450.

In the embodiment illustrated in FIGS. 12A to 12D, the widths of the first medium 400 and the second medium 450 corresponding to the top surface of the light guide plate 200 are substantially equal, but are not limited thereto. FIGS. 13A to 13D illustrate a variation of the light guide plate 200 illustrated in FIGS. 12A to 12D, wherein the widths of the first medium 400 and the second medium 450 corresponding to the top surface of the light guide plate 200 increase along an extending direction 600 toward the light entrance end 230.

In the embodiments illustrated in FIGS. 8 to 13D, the first medium 400 and the second medium 450 are selected from triangular prisms, but are not limited thereto; in different embodiments, the first medium 400 and the second medium 450 can be selected from rectangular prisms, trapezoidal prisms, oval prisms, circular prisms, or other prisms with suitable shapes.

The above is detailed descriptions of the particular embodiments of the invention which is not intended to limit the invention to the embodiments described. It is recognized that modifications within the scope of the invention will occur to a person skilled in the art. Such modifications and equivalents of the invention are intended for inclusion within the scope of this invention.

What is claimed is:

1. A light guide plate, comprising:
a light guide plate body, including a continuous light entrance end and a plurality of gaps extending perpendicular to the light entrance end and substantially parallel to one another, opposite ends of each gap defined at a distance from a corresponding edge of the light guide plate body along an extending direction of the gaps; and
a plurality of first mediums disposed in the gaps, wherein a refractive index of the light guide plate body is greater than a refractive index of the first medium; a thickness of the first mediums increases along an extending direction of the first medium toward the light entrance end.

2. A display system including light guide plate of claim 1, further comprising:
a display panel having an active area;
wherein the light guide plate body has an active region with a size corresponding to the active area and the gaps are located within the active region.

3. The light guide plate of claim 1, further including a plurality of microstructure layers disposed on a bottom of the light guide plate body, wherein an interval exists between two adjacent microstructure layers and corresponds to the gap.

4. A backlight module, comprising:
the light guide plate of claim 1; and
a plurality of light emitting elements, wherein each of the light emitting elements is disposed at a position of the light guide plate corresponding to the light entrance end and emits a light into the light guide plate body from the light entrance end.

5. The light guide plate of claim 1, further including a plurality of second mediums disposed in the gaps, wherein the first medium and the second medium disposed in the same gap contact different portions of the light guide plate body, the refractive index of the first medium is smaller than a refractive index of the second medium.

6. The light guide plate of claim 5, wherein the first medium and the second medium have same extending direction, a thickness of the first medium and a thickness of the second medium increase along the extending direction toward the light entrance end.

7. The light guide plate of claim 1, wherein the light guide plate body includes a top and a bottom, wherein a thickness of the first medium near the top of the light guide plate body is greater than the thickness of the first medium near the bottom of the light guide plate body.

8. The light guide plate of claim 7, wherein a shape of the first medium includes a triangular prism or a trapezoidal prism.

9. The light guide plate of claim 1, wherein the light guide plate body includes:
a plurality of light guide blocks arranged side by side, wherein the gap is located between two adjacent light guide blocks; and
a plurality of connection blocks, wherein two ends of the connection block connect to two adjacent light guide blocks.

10. The light guide plate of claim 9, wherein the first mediums are in the gaps along a surface of the connection block.

11. The light guide plate of claim 9, wherein the first medium is disposed on the connection block.

12. The light guide plate of claim 11, wherein the light guide block and the connection block are made of the same material.

13. The light guide plate of claim 11, wherein the light guide block and the connection block are made of materials with different refractive indexes.

14. A light guide plate, comprising:
a top;
a bottom;
a plurality of light guide blocks arranged side by side and substantially parallel to each other, wherein adjacent light guide blocks are at least partially connected, each of the light guide blocks includes a light entrance end; and
a plurality of first mediums disposed between the adjacent light guide blocks, wherein a refractive index of the light guide block is greater than a refractive index of the first medium, a thickness of the first medium near the top is greater than the thickness of the first medium near the bottom.

15. The light guide plate of claim 14, wherein a shape of the first medium includes a triangular prism or a trapezoidal prism.

16. The light guide plate of claim 14, wherein a thickness of the first medium increases along an extending direction toward the light entrance end.

17. The light guide plate of claim 14, further including a plurality of microstructure layers disposed on a bottom of the light guide block, wherein an interval exists between two adjacent light guide blocks and corresponds to the first medium.

18. A backlight module, comprising:
the light guide plate of claim 14; and
a plurality of light emitting elements, wherein each of the light emitting elements is disposed at a position corresponding to the light entrance end of one of the light guide blocks and emits a light into the light guide block from the light entrance end.

19. The light guide plate of claim 14, further including a plurality of second mediums disposed between two adjacent light guide blocks, wherein the first medium and the second medium between two adjacent light guide blocks contact different portions of the light guide blocks, the refractive index of the first medium is smaller than a refractive index of the second medium.

20. The light guide plate of claim 19, wherein the first medium and the second medium have same extending direction, a thickness of the first medium and a thickness of the second medium increase along the extending direction toward the light entrance end.

21. The light guide plate of claim 14, further including a plurality of connection blocks, wherein two opposite ends of the connection block respectively connect to two adjacent light guide blocks to form at least one gap between the adjacent light guide blocks, the gap extends perpendicular to the light entrance end, the first medium is located in the gap.

22. A display system including light guide plate of claim 21, further comprising:
a display panel having an active area;
wherein the light guide plate has an active region with a size corresponding to the active area and the gap is located within the active region.

23. The display system of claim 22, wherein a portion of the connection block is located outside the active region.

24. The light guide plate of claim 21, wherein the first medium is disposed in the gap along a surface of the connection block.

25. The light guide plate of claim 21, wherein the first medium is stacked on the connection block.

26. The light guide plate of claim 25, wherein the light guide block and the connection block are made of the same material.

27. The light guide plate of claim 25, wherein the light guide block and the connection block are made of materials with different refractive index.

* * * * *